(12) United States Patent
Haffenden

(10) Patent No.: US 10,944,785 B2
(45) Date of Patent: Mar. 9, 2021

(54) SYSTEMS AND METHODS FOR DETECTING THE INJECTION OF MALICIOUS ELEMENTS INTO BENIGN CONTENT

(71) Applicant: Forcepoint LLC, Austin, TX (US)

(72) Inventor: Mark Haffenden, Reading (GB)

(73) Assignee: Forcepoint LLC, Austin, TX (US)

( * ) Notice: Subject to any disclaimer, the term of this patent is extended or adjusted under 35 U.S.C. 154(b) by 135 days.

(21) Appl. No.: 16/391,714

(22) Filed: Apr. 23, 2019

(65) Prior Publication Data

US 2020/0344258 A1   Oct. 29, 2020

(51) Int. Cl.
*H04L 29/06* (2006.01)
*H04L 9/06* (2006.01)

(52) U.S. Cl.
CPC ........ *H04L 63/1466* (2013.01); *H04L 9/0643* (2013.01); *H04L 63/1425* (2013.01); *H04L 63/20* (2013.01)

(58) Field of Classification Search
CPC ............... H04L 63/1466; H04L 9/0643; H04L 63/1425; H04L 63/20
See application file for complete search history.

(56) References Cited

U.S. PATENT DOCUMENTS

| | | | | |
|---|---|---|---|---|
| 9,009,829 B2* | 4/2015 | Stolfo | ................... | G06F 21/554 726/23 |
| 10,447,718 B2* | 10/2019 | Ford | ................... | H04L 63/1416 |
| 10,623,431 B2* | 4/2020 | Ford | ....................... | H04L 67/10 |
| 10,642,998 B2* | 5/2020 | Ford | ....................... | G06F 21/84 |
| 10,798,109 B2* | 10/2020 | Ford | .................... | H04L 63/205 |
| 10,819,683 B2* | 10/2020 | Rahkonen | ............. | H04L 63/123 |
| 2007/0130350 A1* | 6/2007 | Alperovitch | .......... | H04L 63/168 709/229 |
| 2008/0177691 A1* | 7/2008 | Alperovitch | ........ | H04L 63/1425 706/48 |

(Continued)

OTHER PUBLICATIONS

Elbegbayan, Winnowing, a Document Fingerprinting Algorithm, TDDC03 Projects, Spring 2005, 8 pages (Year: 2005).*

(Continued)

*Primary Examiner* — Oleg Korsak
(74) *Attorney, Agent, or Firm* — Jackson Walker L.L.P.

(57) ABSTRACT

A method, system, and computer-usable medium are disclosed for include receiving a first version of content from a resource, generating a first lightweight fingerprint for the first version of the content, receiving a second version of the content from the same resource, generating a second lightweight fingerprint for the second version of the content, comparing the first lightweight fingerprint to the second lightweight fingerprint to determine changes to a non-injectable section of the content and potentially-injected sections of the content between the first version and the second version, and determining the content to include potentially malicious elements responsive to determining that the non-injectable section of the content have remained substantially static between the first version and the second version and determining that potentially-injected sections of the content has substantially changed between the first version and the second version.

21 Claims, 7 Drawing Sheets

(56) References Cited

U.S. PATENT DOCUMENTS

2008/0178288 A1* 7/2008 Alperovitch ........ H04L 63/0227
726/22
2013/0247192 A1* 9/2013 Krasser ............... H04L 63/1425
726/23
2017/0195353 A1* 7/2017 Taylor ................. G06F 12/0813

OTHER PUBLICATIONS

Darwish, New system to fingerprint extensible markup language documents using winnowing theory, IET Signal Process., 2012, vol. 6, Iss. 4, pp. 348-357 (Year: 2012).*
Kapravelos, Analyzing and Defending Against Evolving Web Threats, PhD thesis, UC Santa Barbara, 2015, 166 pages (Year: 2015).*

* cited by examiner

```
<HTML>
<HEAD>
<TITLE>Your Title Here</TITLE>
</HEAD>
<BODY 5 :COLOR="FFFFFF">
<CENTER><IMG SRC= "clouds.jpg" ALIGN="BOTTOM" ></CENTER>
<IFRAME src="http://malsite.com/iframe.html" ></IFRAME>          ← 502
<HR>
<a href="http://site.com">Link Name</a>
<H1>This is a Header</H1>
Send me mail at <a hint="mailto:support@yourcompany.com" >
support@yourcompany.com</a>.
<SCRIPT TYPE="text/javascript">document.write ('<scr '+' ipt sr '+' ic "ht '+' itp://mals '+' lite.com/sc'+   ← 504
<P>This is a new paragraph!
<P> <B>This is a new paragraph!</B>
<script src="http://malsite.com/script.js"></script>              ← 506
<BR> <B> <I> This is a new sentence without a paragraph break, in bold italics.</I></B>
<HR>
</BODY>
</HTML>
```

FIG. 5

```
<HTML>
<HEAD>
<TITLE>Your Title Here</TITLE>
</HEAD>
<BODY 5 :COLOR="FFFFFF">
<CENTER><IMG SRC= "clouds.jpg" ALIGN="BOTTOM"> </CENTER>
<HR>
<a href="http://site.com">Link Name</a>
<H1>This is a Header</H1>
Send me mail at <a href="mailto:support@yourcompany.com">
support@yourcompany.com</a>.
<P>This is a new paragraph!
<P> <B> This is a new paragraph!</B>
<BR> <B> <I> This is a new sentence without a paragraph break, in bold italics. </I></B>
<HR>
</BODY>
</HTML>
```
— 602

604 — `<IFRAME src="'http://malsite.com/iframe.html"></ IFRAME>`

606 — `<SCRIPT TYPE="'text/javascript">document.write (' <scr '+' ic"ht '+' itp://mals '+' lite.com/sc '+' ri`

608 — `<script src="'http://malsite.com/script.js"></script>`

FIG. 6

SYSTEMS AND METHODS FOR DETECTING THE INJECTION OF MALICIOUS ELEMENTS INTO BENIGN CONTENT

FIELD OF DISCLOSURE

The present invention relates in general to the field of computers and similar technologies, and in particular to software utilized in this field. Still more particularly, it relates to a method, system, and computer-usable medium for detection of injections of malicious elements into benign content, such as a benign web page.

BACKGROUND

While network communication among networked computers, including the use of the Internet, has many advantages, one downside to network communication is that it may render networked computers susceptible to malicious attacks from viruses or other intrusions. One particular type of intrusion may include the injection of malicious elements (e.g., malicious scripts) into otherwise benign content, such as a benign web page.

Delivery of malicious software via the World Wide Web often relies on injection of attacker-authored content into an otherwise legitimate web page. For example, two common methods of injection are the injection of an iframe (e.g., a HyperText Markup Language (HTML) document embedded inside another HTML document) and injection of a script. The problem in detecting such injections is identifying web pages which include malicious injections. In some circumstances, the method of injection offers some stylistic clues (e.g., injected content appearing at the beginning or end of a document, injected content being in uppercase while remaining content is lowercase or vice versa). However, in many instances the injection may only be detected by comparing a newer version of a web page with an older version of the web page, which may be time consuming and require significant storage resources.

SUMMARY

In accordance with the teachings of the present disclosure, certain disadvantages and problems associated with existing approaches to network and data security have been reduced or eliminated.

In accordance with embodiments of the present disclosure, a computer-implementable method may include receiving a first version of content from a resource, generating a first lightweight fingerprint for the first version of the content, receiving a second version of the content from the same resource, generating a second lightweight fingerprint for the second version of the content, comparing the first lightweight fingerprint to the second lightweight fingerprint to determine changes to a non-injectable section of the content and potentially-injected sections of the content between the first version and the second version, and determining the content to include potentially malicious elements responsive to determining that the non-injectable section of the content has remained substantially static between the first version and the second version and determining that potentially-injected sections of the content have substantially changed between the first version and the second version.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured to include receiving a first version of content from a resource, generating a first lightweight fingerprint for the first version of the content, receiving a second version of the content from the same resource, generating a second lightweight fingerprint for the second version of the content, comparing the first lightweight fingerprint to the second lightweight fingerprint to determine changes to a non-injectable section of the content and potentially-injected sections of the content between the first version and the second version, and determining the content to include potentially malicious elements responsive to determining that the non-injectable section of the content has remained substantially static between the first version and the second version and determining that potentially-injected sections of the content have substantially changed between the first version and the second version.

In accordance with these and other embodiments of the present disclosure, a non-transitory, computer-readable storage medium may embody computer program code, the computer program code comprising computer executable instructions configured to include receiving a first version of content from a resource, generating a first lightweight fingerprint for the first version of the content, receiving a second version of the content from the same resource, generating a second lightweight fingerprint for the second version of the content, comparing the first lightweight fingerprint to the second lightweight fingerprint to determine changes to a non-injectable section of the content and potentially-injected sections of the content between the first version and the second version, and determining the content to include potentially malicious elements responsive to determining that the non-injectable section of the content has remained substantially static between the first version and the second version and determining that potentially-injected sections of the content have substantially changed between the first version and the second version.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein:

FIG. 5 illustrates an example HTML page for rendering a web page, in accordance with embodiments of the present disclosure;

FIG. 6 illustrates an example partitioning of the HTML page of FIG. 5 into multiple sections, in accordance with embodiments of the present disclosure;

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
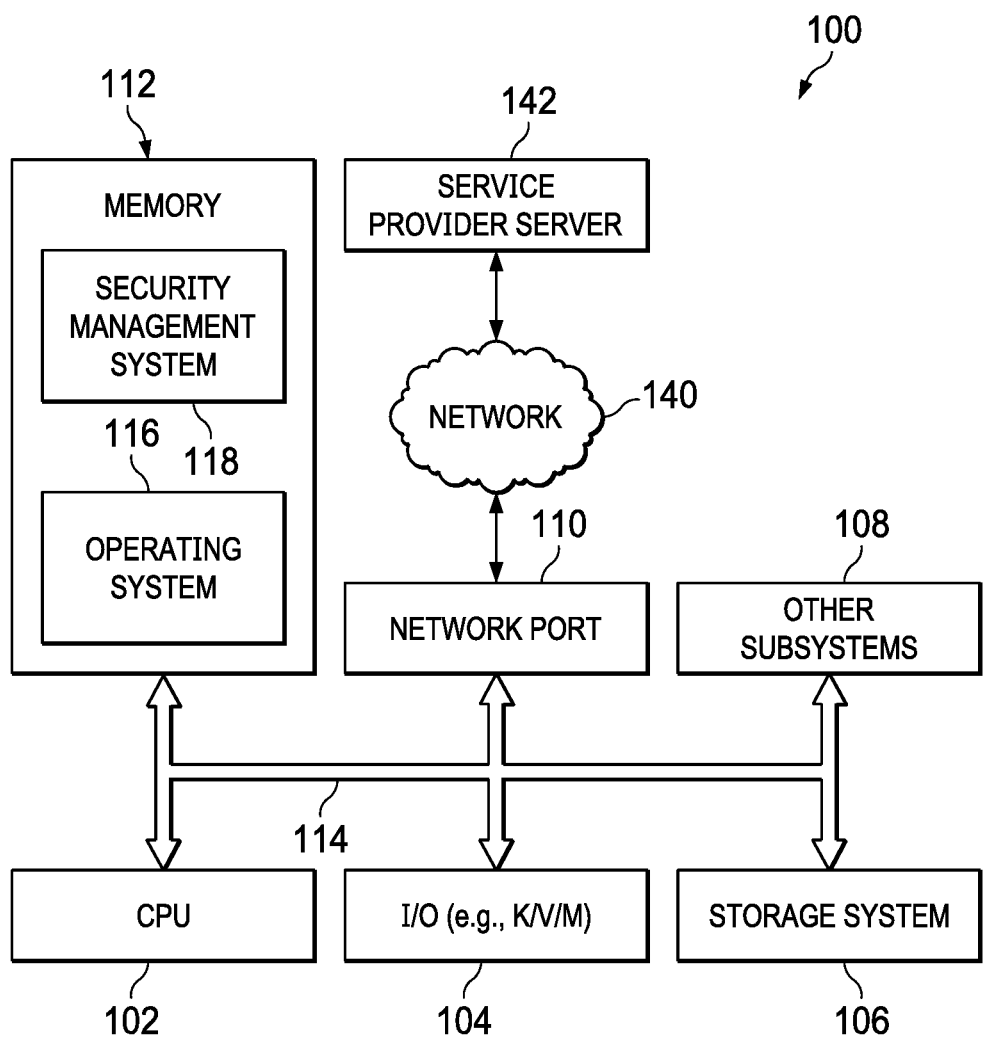
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may (as described in greater detail below) be configured to perform detection of injection of malicious elements injected into benign content, such as content in a web page for example. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling detection of injection of malicious elements injected into benign content as described herein.

Figure 2:
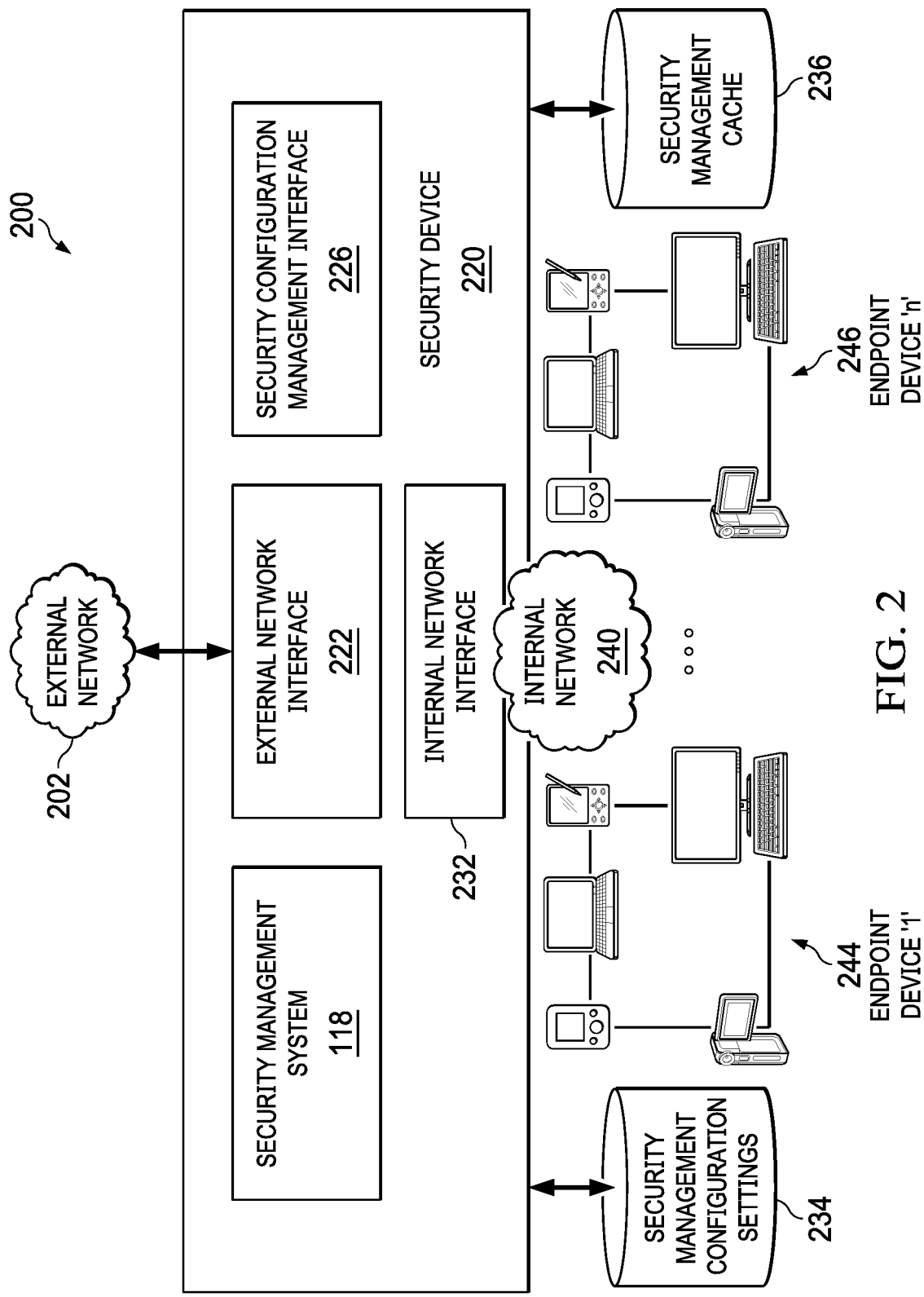
FIG. 2 illustrates a block diagram of a system for detection of injection of malicious elements into benign content, in accordance with embodiments of the present disclosure.

FIG. 2 illustrates a block diagram of a system 200 for detection of injection of malicious elements injected into benign content, in accordance with embodiments of the present disclosure. In some embodiments, a security device 220 may include an external network interface 222 interfaced to external network 202, a security configuration management interface 226, an internal network interface 232, and a security management system 118. Security device 220 may be implemented using any suitable information handling system 100, including without limitation a web proxy, a gateway, a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling detection of injection of malicious elements into benign content, as described herein. For example, security management system 118 may, each time a particular resource of content (e.g., an HTML file) is received, create a lightweight fingerprint of the content. Such lightweight fingerprint may capture base elements of the content, such as headings, paragraphs, and images, as well as injectable content such as scripts and iframes. After creating a lightweight fingerprint, security management system 118 may compare the most-recently created lightweight fingerprint for the content with a previously-created lightweight fingerprint (e.g., the second-most-recently created lightweight fingerprint) for the content, to determine a likelihood of injection of malicious elements. For example, a scenario in which non-injectable content of the content has changed between the compared fingerprints while potentially-injected content has changed significantly may be indicative of a likelihood of malicious injection. However, if both non-injectable content and potentially-injected content have both changed significantly between the compared fingerprints, such a scenario may indicate a low likelihood of malicious injection.

Figure 3:
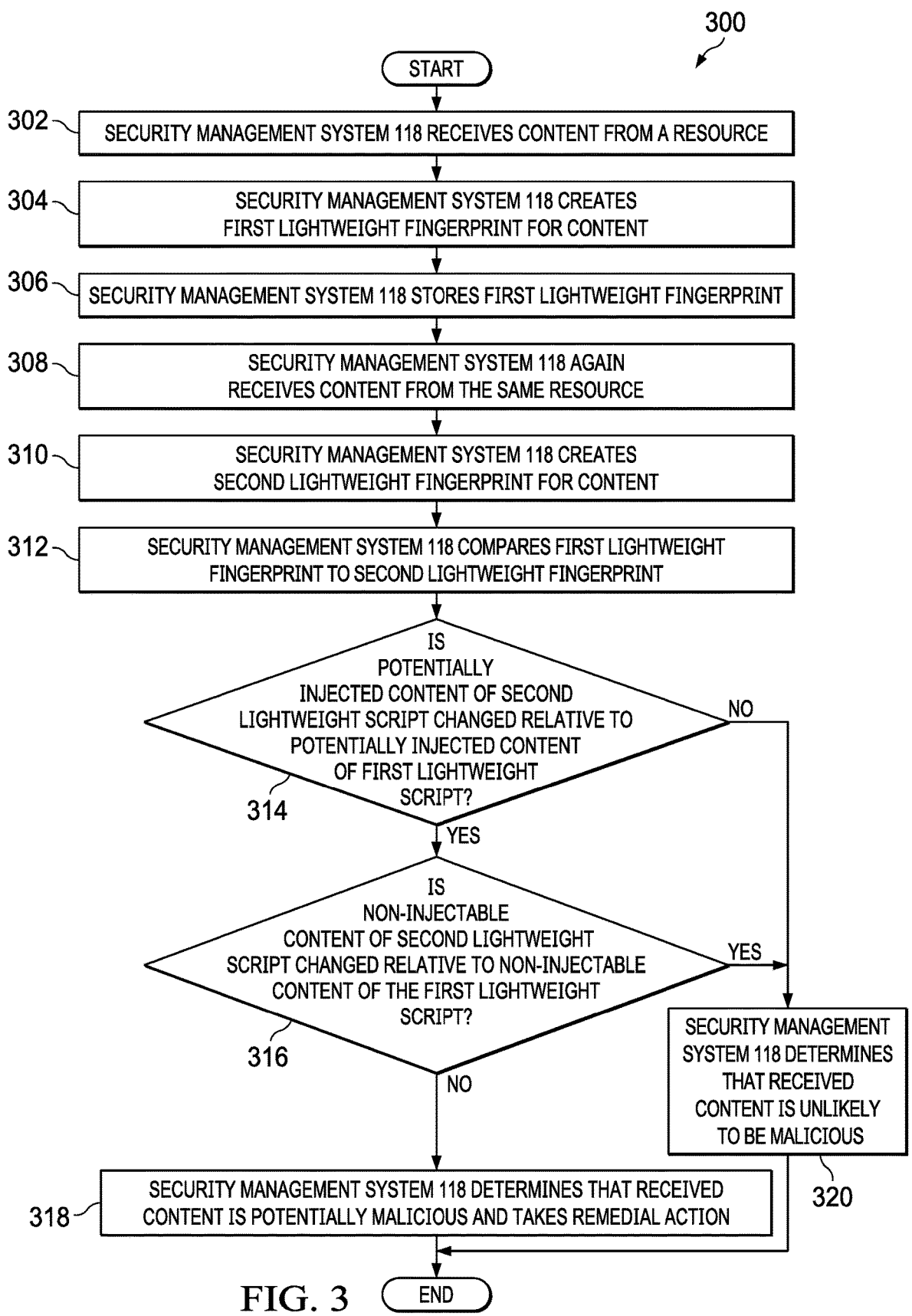
FIG. 3 illustrates a flow chart of an example method for detection of injection of malicious elements into benign content, in accordance with embodiments of the present disclosure.

FIG. 3 illustrates a flow chart of an example method 300 for performing detection of injection of malicious elements injected into benign content, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, security management system 118 may receive content (e.g., an HTML file) from a resource (e.g., a Uniform Resource Locator or "URL"). At step 304, responsive to receiving such content, security management system 118 may create a first lightweight fingerprint for the content, as described in greater detail below with respect to the description of method 400. Such first lightweight fingerprint may capture base elements of the content, such as headings, paragraphs, and images, as well as injectable content such as scripts and iframes. At step 306, security management system 118 may store (e.g., in security management cache 236 or other computer-readable media accessible to security management system) the first lightweight fingerprint.

At step 308, at a later time, security management system 118 may again receive content (e.g., an HTML file) from the same resource (e.g., a Uniform Resource Locator or "URL"), wherein such content may be the same as it was the last time it was received, or may have changed. At step 310, responsive to receiving such content, security management system 118 may create a second lightweight fingerprint for the content, as described in greater detail below with respect to the description of method 400. Such second lightweight fingerprint may also capture base elements of the content, such as headings, paragraphs, and images, as well as injectable content such as scripts and iframes.

At step 312, security management system 118 may retrieve the first lightweight fingerprint (e.g., from security management cache 236 or other computer-readable media accessible to security management system 118) and compare the first lightweight fingerprint to the second lightweight fingerprint. At step 314, security management system 118 may determine if the potentially-injected content of the second lightweight script has changed relative to the potentially-injected content of the first lightweight script. If the potentially-injected content has changed, method 300 may proceed to step 316. Otherwise, method 300 may proceed to step 320.

At step 316, responsive to a determination that the potentially-injected content has changed from the first lightweight script to the second lightweight script, security management system 118 may determine if the non-injectable content of the second lightweight script has changed relative to the non-injectable content of the first lightweight script. If the non-injectable content of the second lightweight script has changed relative to the non-injectable content of the first lightweight script, method 300 may proceed to step 320. Otherwise, method 300 may proceed to step 318.

At step 318, responsive to a determination that the potentially-injected content has changed from the first lightweight script to the second lightweight script but that the non-injectable content has not changed from the first lightweight script to the second lightweight script, security management system 118 may determine that the received content (e.g., the content received at step 308) is potentially malicious, and may take remedial action (e.g., restrict or prevent execution of the content, generate an alert to a user and/or an administrator of an endpoint device 244, 246, etc.). After completion of step 318, method 300 may end.

At step 320, responsive to a determination that the potentially-injected content has not changed from the first lightweight script to the second lightweight script or that the non-injectable content has changed from the first lightweight script to the second lightweight script, security management system 118 may determine that the received content (e.g., the content received at step 308) is unlikely to be malicious. After completion of step 320, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Figure 4:
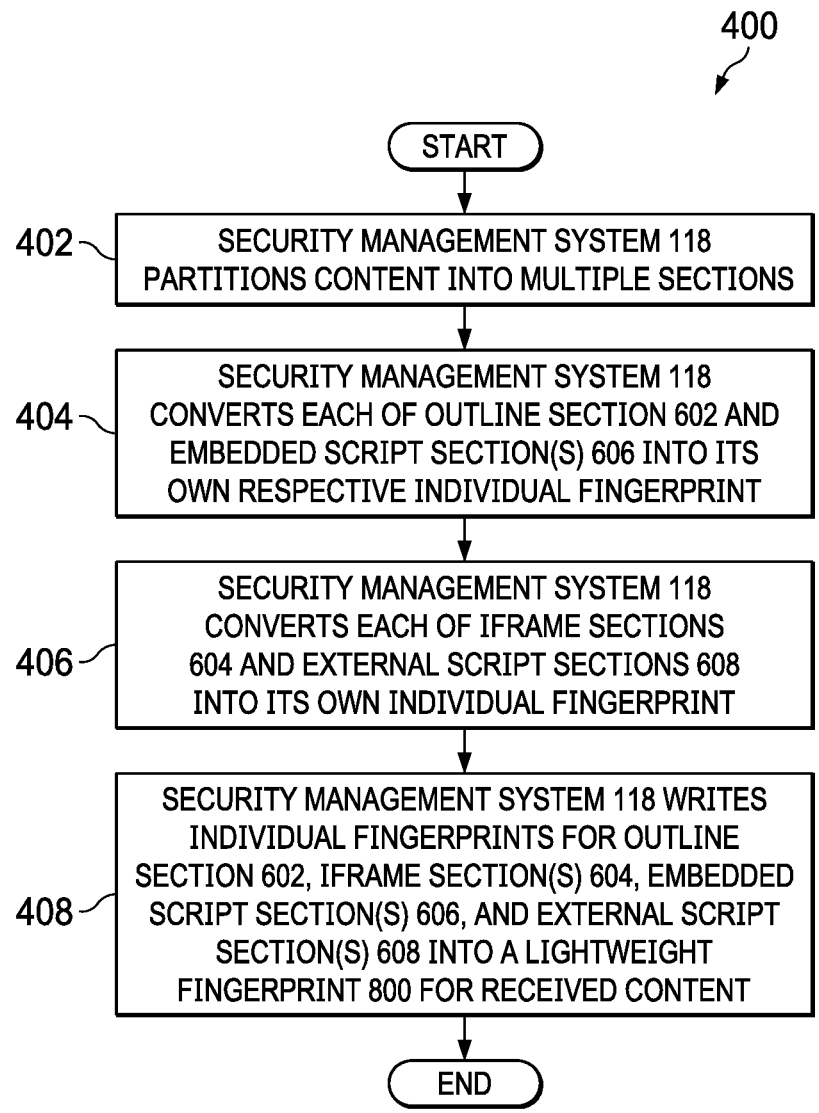
FIG. 4 illustrates a flow chart of an example method for generating a lightweight fingerprint of content, for use in detection of injection of malicious elements into benign content, in accordance with embodiments of the present disclosure.

FIG. 4 illustrates a flow chart of an example method 400 for generating a lightweight fingerprint of content, for use in detection of injection of malicious elements into benign content, in accordance with embodiments of the present disclosure. According to some embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

Method 400 may be used to generate a lightweight fingerprint of content, such as that described with respect to steps 304 and 310 of method 300.

At step 402, security management system 118 may partition content into multiple sections. For example, with respect to an HTML file, security management system 118 may parse the HTML file based on HTML tags appearing in the HTML file. To further illustrate, FIG. 5 illustrates an example HTML page 500 for rendering a web page, in accordance with embodiments of the present disclosure. As shown, example HTML page 500 includes typical page content along with three potential injections and FIG. 6 illustrates an example partitioning 600 of HTML page 500 of FIG. 5 into multiple sections, in accordance with embodiments of the present disclosure. In parsing HTML page 500, any content not within a tag for an iframe or a script may be partitioned into an outline section 602. Each potential injection 502, 504, and 506 may be partitioned into its own section 604, 606, and 608 of partitioning 600. Thus, outline section 602 may represent a page body of example HTML page 500, iframe section 604 may represent an iframe of example HTML page 500, embedded script section 606 may represent an embedded script of example HTML page 500, and external script section 608 may represent an external script of example HTML page 500. Although partitioning 600 includes only one iframe section 604, one embedded script section 606, and one external script section 608, some HTML pages may have multiple potential objections, and thus a partitioning 600 may include any number and combination of iframe sections 604, embedded script sections 606, and external script sections 608, and a fingerprint of each iframe section 604, embedded script section 606, and external script section 608 may be generated as described in greater detail below.

Figure 7:
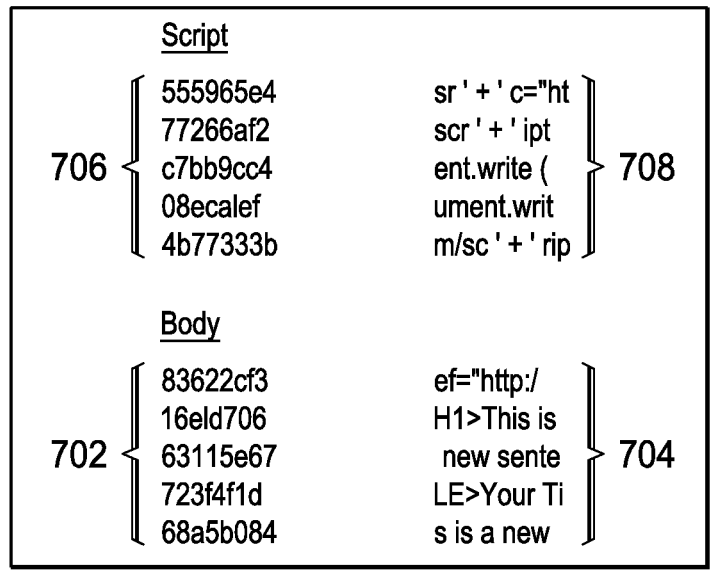
FIG. 7 illustrates an example winnowing hash for certain sections of the partitioning of FIG. 6, in accordance with embodiments of the present disclosure.

At step 404, security management system 118 may convert outline section 602 and each embedded script section 606 into their own respective individual fingerprints. For example, security management system 118 may apply the known technique of winnowing to each of outline section 602 and embedded script section(s) 606. Winnowing may allow a string of text to be reduced to an arbitrary number of hashes by applying a sliding window of a certain number of bytes across the string of text and taking a hash for each window position. A certain number of these hashes may be chosen, based on a consistent mechanism (e.g., highest or lowest alphabetically), to represent the string of text. Thus, in this step 404, security management system 118 may apply winnowing to each of outline section 602 and embedded script section(s) 606 to generate respective individual fingerprints for each. To illustrate, FIG. 7 illustrates an example individual fingerprint 702 for outline section 602 of FIG. 6 and its associated sliding window data 704, and example individual fingerprint 706 for embedded script section 606 of FIG. 6 and its associated sliding window data 708, in accordance with embodiments of the present disclosure. Although FIG. 7 illustrates one particular approach for generating individual fingerprints (e.g., using the final eight characters of the lowest alphabetical md5 hashes using a 10-character window), any other appropriate fingerprinting approach may be used.

As step 406, security management system 118 may convert each of iframe sections 604 and external script sections 608 into its own respective two-part fingerprint. Each two-part fingerprint may include a first part including a host name and a second part including a final file name.

Figure 8:
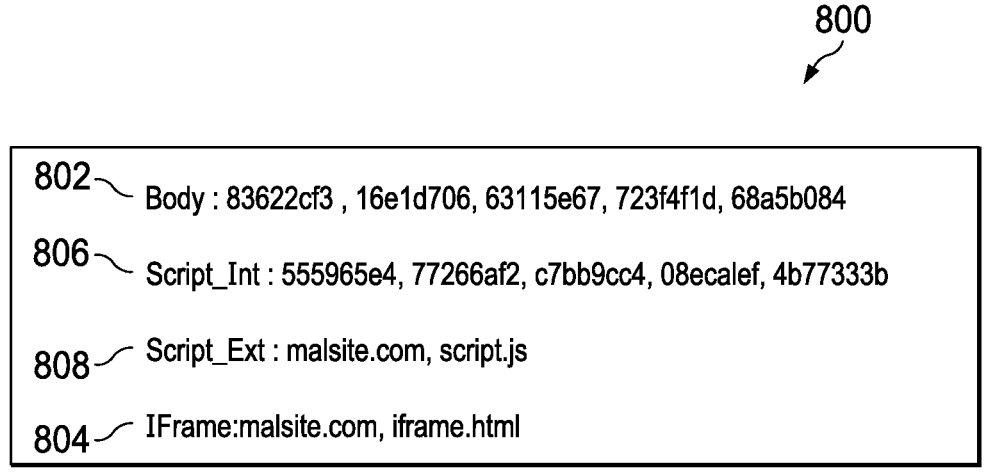
FIG. 8 illustrates lightweight fingerprints of the various multiple sections of the partitioning of FIG. 6, in accordance with embodiments of the present disclosure.

At step 408, security management system 118 may write the individual fingerprints for outline section 602, iframe section(s) 604, embedded script section(s) 606, and external script section(s) 608 into a lightweight fingerprint 800 for the received content, as shown in FIG. 8. As shown in FIG. 8, lightweight fingerprint 800 may include individual fingerprint 802 for outline section 602, individual fingerprint(s) 804 for iframe section(s) 604, individual fingerprint(s) 806 for embedded script section(s) 606, and individual fingerprint(s) 808 for external script section(s) 608.

After completion of step 408, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using CPU 102, security management system 118 executing thereon, and/or any other system operable to implement method 400. In certain embodiments, method 400 may be implemented partially or fully in software and/or firmware embodied in computer-readable media.

Accordingly, using the systems and methods described herein, content (e.g., an HTML file) may be parsed based on characteristics of portions of the content (e.g., tags) into a plurality of sections, wherein an individual fingerprint is generated for each section (e.g., using winnowing or using a two-part fingerprint). The final lightweight fingerprint for the content may include all of such generated individual fingerprints, which includes an individual fingerprint for the non-injectable portion of the content and an individual fingerprint for each potentially-injected portion of the content. Thus, content can easily be compared to a previous version of the content to detect if a potentially-malicious injection has occurred to the content. A winnow hash may be used on some sections of the content, and such winnow hash may be more robust to content changes than a hash of an entire section. The use of a lightweight fingerprint to represent content may allow for practical storage costs and the processing resources required for fingerprint calculation and comparison to be insignificant.

Although the foregoing contemplates that security management system 118 resides in security device 220, in some embodiments, security management system 118 may be implemented by a device external to security device 220, including without limitation a device within external network 202, and an endpoint device 244, 246.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implementable method comprising:
   receiving a first version of content from a resource;
   generating a first lightweight fingerprint for the first version of the content;
   receiving a second version of the content from the same resource;
   generating a second lightweight fingerprint for the second version of the content;
   comparing the first lightweight fingerprint to the second lightweight fingerprint to determine changes to a non-injectable section of the content and potentially-injected sections of the content between the first version and the second version; and
   determining the content to include potentially malicious elements responsive to determining that the non-injectable section of the content has remained substantially static between the first version and the second version and determining that potentially-injected sections of the content have substantially changed between the first version and the second version.

2. The computer-implementable method of claim 1, further comprising taking remedial action responsive to determining the content to include potentially malicious elements.

3. The computer-implementable method of claim 1, further comprising determining a low likelihood of potentially malicious elements responsive to one of:
   a first condition comprising determining that potentially-injected sections of the content have remained substantially static between the first version and the second version; and
   a second condition comprising determining that the non-injectable section of the content has substantially changed between the first version and the second version.

4. The computer-implementable method of claim 1, wherein generating a lightweight fingerprint comprising one of the first lightweight fingerprint and the second lightweight fingerprint comprises:
   partitioning content into a plurality of sections including an outline section associated with non-injectable content of the content and at least one potentially-injectable section wherein each of the at least one potentially-injectable section is associated with a potentially-injectable element of the content;
   generating respective individual fingerprints for each of the outline section and the at least one potentially-injectable section; and
   combining the respective individual fingerprints to form the lightweight fingerprint.

5. The computer-implementable method of claim 4, wherein generating an individual fingerprint for one of the outline section and an embedded script section of the at least one potentially-injectable section comprises generating a winnowing hash for the outline section.

6. The computer-implementable method of claim 4, wherein generating an individual fingerprint for one of an external script section and an iframe section of the at least one potentially-injectable section comprises generating a two-part fingerprint comprising a host name and a final file name.

7. The computer-implementable method of claim 1, wherein the content comprises a HyperText Markup Language file for rendering a web page.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving a first version of content from a resource;

generating a first lightweight fingerprint for the first version of the content;

receiving a second version of the content from the same resource;

generating a second lightweight fingerprint for the second version of the content;

comparing the first lightweight fingerprint to the second lightweight fingerprint to determine changes to a non-injectable section of the content and potentially-injected sections of the content between the first version and the second version; and determining the content to include potentially malicious elements responsive to determining that the non-injectable section of the content has remained substantially static between the first version and the second version and determining that potentially-injected sections of the content have substantially changed between the first version and the second version.

9. The system of claim 8, the instructions further configured for taking remedial action responsive to determining the content to include potentially malicious elements.

10. The system of claim 8, the instructions further configured for determining a low likelihood of potentially malicious elements responsive to one of:

a first condition comprising determining that potentially-injected sections of the content have remained substantially static between the first version and the second version; and a second condition comprising determining that the non-injectable section of the content has substantially changed between the first version and the second version.

11. The system of claim 8, wherein generating a lightweight fingerprint comprising one of the first lightweight fingerprint and the second lightweight fingerprint comprises:

partitioning content into a plurality of sections including an outline section associated with non-injectable content of the content and at least one potentially-injectable section wherein each of the at least one potentially-injectable section is associated with a potentially-injectable element of the content;

generating respective individual fingerprints for each of the outline section and the at least one potentially-injectable section; and combining the respective individual fingerprints to form the lightweight fingerprint.

12. The system of claim 11, wherein generating an individual fingerprint for one of the outline section and an embedded script section of the at least one potentially-injectable section comprises generating a winnowing hash for the outline section.

13. The system of claim 11, wherein generating an individual fingerprint for one of an external script section and an iframe section of the at least one potentially-injectable section comprises generating a two-part fingerprint comprising a host name and a final file name.

14. The system of claim 8, wherein the content comprises a HyperText Markup Language file for rendering a web page.

15. A non-transitory, computer-readable storage medium embodying computer program code, the computer program code comprising computer executable instructions configured for:

receiving a first version of content from a resource;

generating a first lightweight fingerprint for the first version of the content;

receiving a second version of the content from the same resource;

generating a second lightweight fingerprint for the second version of the content;

comparing the first lightweight fingerprint to the second lightweight fingerprint to determine changes to a non-injectable section of the content and potentially-injected sections of the content between the first version and the second version; and determining the content to include potentially malicious elements responsive to determining that the non-injectable section of the content has remained substantially static between the first version and the second version and determining that potentially-injected sections of the content have substantially changed between the first version and the second version.

16. The storage medium of claim 15, the instructions further configured for taking remedial action responsive to determining the content to include potentially malicious elements.

17. The storage medium of claim 15, the instructions further configured for determining a low likelihood of potentially malicious elements responsive to one of:

a first condition comprising determining that potentially-injected sections of the content have remained substantially static between the first version and the second version; and a second condition comprising determining that the non-injectable section of the content has substantially changed between the first version and the second version.

18. The storage medium of claim 15, wherein generating a lightweight fingerprint comprising one of the first lightweight fingerprint and the second lightweight fingerprint comprises:

partitioning content into a plurality of sections including an outline section associated with non-injectable content of the content and at least one potentially-injectable section wherein each of the at least one potentially-injectable section is associated with a potentially-injectable element of the content;

generating respective individual fingerprints for each of the outline section and the at least one potentially-injectable section; and combining the respective individual fingerprints to form the lightweight fingerprint.

19. The storage medium of claim 18, wherein generating an individual fingerprint for one of the outline section and an embedded script section of the at least one potentially-injectable section comprises generating a winnowing hash for the outline section.

20. The storage medium of claim 18, wherein generating an individual fingerprint for one of an external script section and an iframe section of the at least one potentially-injectable section comprises generating a two-part fingerprint comprising a host name and a final file name.

21. The storage medium of claim 15, wherein the content comprises a HyperText Markup Language file for rendering a web page.

* * * * *